United States Patent
Jen et al.

(10) Patent No.: US 10,185,075 B2
(45) Date of Patent: Jan. 22, 2019

(54) REFLECTIVE DISPLAY APPARATUS AND FRONT LIGHT STRUCTURE THEREOF

(71) Applicant: E Ink Holdings Inc., Hsinchu (TW)

(72) Inventors: Hsin-Hao Jen, Hsinchu (TW); Ying-Ming Li, Hsinchu (TW); Yao-Ting Tseng, Hsinchu (TW); Chin-Hsuan Kuang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 10 days.

(21) Appl. No.: 15/636,664

(22) Filed: Jun. 29, 2017

(65) Prior Publication Data

US 2017/0299937 A1 Oct. 19, 2017

Related U.S. Application Data

(63) Continuation of application No. 14/660,951, filed on Mar. 18, 2015.

(30) Foreign Application Priority Data

Dec. 10, 2014 (TW) .............................. 103143038 A (51) Int. Cl.
| | |
|---|---|
| G02B 6/00 | (2006.01) |
| F21V 8/00 | (2006.01) |
| G02F 1/167 | (2006.01) |
| G02F 1/13357 | (2006.01) |
| G09G 3/34 | (2006.01) |
| G02F 1/1335 | (2006.01) |

(52) U.S. Cl.
CPC ......... *G02B 6/0053* (2013.01); *G02F 1/1336* (2013.01); *G02F 1/167* (2013.01); *G09G 3/344* (2013.01); *G09G 3/3406* (2013.01); *G02B 6/005* (2013.01); *G02F 2001/133616* (2013.01)

(58) Field of Classification Search
None
See application file for complete search history.

(56) References Cited

U.S. PATENT DOCUMENTS

| | | |
|---|---|---|
| 6,215,920 B1 | 4/2001 | Whitehead et al. |
| 7,997,783 B2 | 8/2011 | Song et al. |
| 8,009,362 B1 | 8/2011 | Chen |
| 8,237,892 B1 | 8/2012 | Sprague et al. |
| 8,395,836 B2 | 3/2013 | Lin |

(Continued)

FOREIGN PATENT DOCUMENTS

| | | |
|---|---|---|
| CN | 1598667 A | 3/2005 |
| CN | 101346650 A | 1/2009 |

(Continued)

OTHER PUBLICATIONS

Corresponding Chinese office action dated Apr. 28, 2018.

*Primary Examiner* — Darryl J Collins
*Assistant Examiner* — Journey Sumlar
(74) *Attorney, Agent, or Firm* — CKC & Partners Co., Ltd.

(57) ABSTRACT

A reflective display device includes a bi-stable display, a front light module and a plurality of light converging films. The front light module is configured to provide a light to the bi-stable display, and the bi-stable display reflects the light. The light converging films are configured to converge the light reflected by the bi-stable display. The refractive index of the light converging film that is closest to the bi-stable display is lower than the refractive index of the light converging film that is farthest from the bi-stable display.

14 Claims, 6 Drawing Sheets

(56) References Cited

U.S. PATENT DOCUMENTS

| | | | |
|---|---|---|---|
| 8,441,414 | B2 | 5/2013 | Lin |
| 2010/0124075 | A1 | 5/2010 | Ye et al. |
| 2012/0257412 | A1 | 10/2012 | Yeom et al. |
| 2015/0003104 | A1 | 1/2015 | Huang et al. |
| 2015/0004382 | A1 | 1/2015 | Menon et al. |

FOREIGN PATENT DOCUMENTS

| | | |
|---|---|---|
| CN | 202330747 U | 7/2012 |
| CN | 102736776 A | 10/2012 |
| CN | 103207495 A | 7/2013 |
| CN | 103293573 A | 9/2013 |
| CN | 103887441 A | 6/2014 |
| TW | 201243447 A1 | 11/2012 |
| TW | 201323949 A1 | 6/2013 |
| WO | 2007082370 A1 | 7/2007 |

REFLECTIVE DISPLAY APPARATUS AND FRONT LIGHT STRUCTURE THEREOF

CROSS REFERENCE TO RELATED APPLICATIONS

This application is a continuation of U.S. application Ser. No. 14/660,951, filed Mar. 18, 2015, which claims priority to Taiwanese Application Serial Number 103143038, filed Dec. 10, 2014, which is herein incorporated by reference.

BACKGROUND

Technical Field

Embodiments of the present invention relate to a display technology. More particularly, embodiments of the present invention relate to a reflective display apparatus and a front light structure thereof.

Description of Related Art

Currently, most electronic book readers employ a reflective display that utilizes natural light, such as sunlight, to provide illumination. Because the brightness of a reflective display is quite reliant on ambient light, once an electronic book reader utilizing a reflective display is placed in a dark environment, the reflective display is often rendered unusable. Therefore, a front light module is disposed on the reflective display, so as to provide additional illumination to the reflective display when there is no or a low level of illumination from ambient light.

A typical front light module includes a light source and a light guide plate. The light guide plate is located above the display panel. The light source is located on the lateral surface of the light guide plate, so as to emit light into the light guide plate through the lateral surface. The top surface of the light guide plate reflects the light into the display panel, so as to enable the display panel to reflect the light, which allows the user to see the image shown by the display panel.

However, some light reflected by the front light module may travel into the display panel at a high incident angle, so this light travels out of the display panel at a high reflection angle, which may then fail to travel into the user's eyes. As a result, the brightness of the reflective display apparatus decreases. If improvement of the brightness of the reflective display apparatus is desired, the brightness of the light source has to be improved, which requires more power and is not eco-friendly. Therefore, balancing the brightness requirement and the eco-friendly requirement is a dilemma of the development of the reflective display technology.

SUMMARY

Embodiments of the present invention balance the brightness requirement and the eco-friendly requirement of the reflective display apparatus. Particularly, embodiments of the present invention improve the brightness of the reflective display apparatus without increasing the power of the front light module.

In accordance with one embodiment of the present invention, a reflective display device includes a bi-stable display, a front light module and a plurality of light converging films. The front light module is configured to provide a light to the bi-stable display, so that the bi-stable display reflects the light. The light converging films are configured to converge the light reflected by the bi-stable display. The refractive index of one of the light converging films that is closest to the bi-stable display is lower than the refractive index of another one of the light converging films that is farthest from the bi-stable display.

In accordance with another embodiment of the present invention, a front light structure includes a front light module and a plurality of light converging films. The light converging films are disposed on the front light module. The refractive index of one of the light converging films that is closest to the front light module is lower than the refractive index of another one of the light converging films that is farthest from the front light module.

In the foregoing embodiment, because the refractive index of the light converging film that is closest to the bi-stable display is lower than the refractive index of the light converging film that is farthest from the bi-stable display, so that the light reflected by the bi-stable display can travel from the optically thinner medium to the optically denser medium, thereby converging inwardly. As a result, even if the light is reflected by the bi-stable display at a high reflection angle, this light can converge inwardly through the light converging films, so as to effectively travel out of the reflective display apparatus and to get into the user's eyes, thereby improving the brightness of the reflective display device.

Moreover, because the brightness is improved by the difference between the refractive indices of the light converging films, the improvement of the brightness of the front light module is not required, which saves power from the front light module and thereby balances the brightness requirement and the eco-friendly requirement of the reflective display apparatus.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
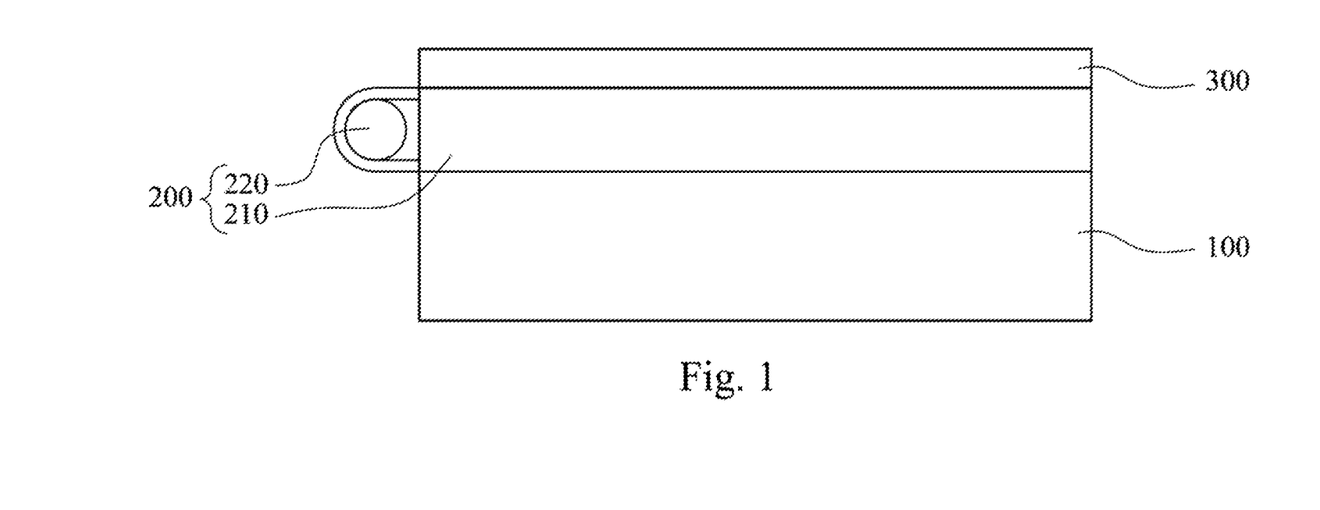
FIG. 1 is a side view of a reflective display apparatus in accordance with one embodiment of the present invention.

FIG. 1 is a side view of a reflective display apparatus in accordance with one embodiment of the present invention.

As shown in FIG. 1, the reflective display apparatus includes a bi-stable display 100 and a front light structure. The front light structure includes a front light module 200 and an optical films assembly 300. The front light module 200 is disposed on the bi-stable display 100, so as to emit light toward the bi-stable display 100. The bi-stable display 100 reflects the light emitted by the front light module 200 toward the optical films assembly 300. The optical films assembly 300 is disposed on the front light module 200 and converges the light reflected by the bi-stable display 100, so as to improve the brightness of the reflective display apparatus.

Figure 2:
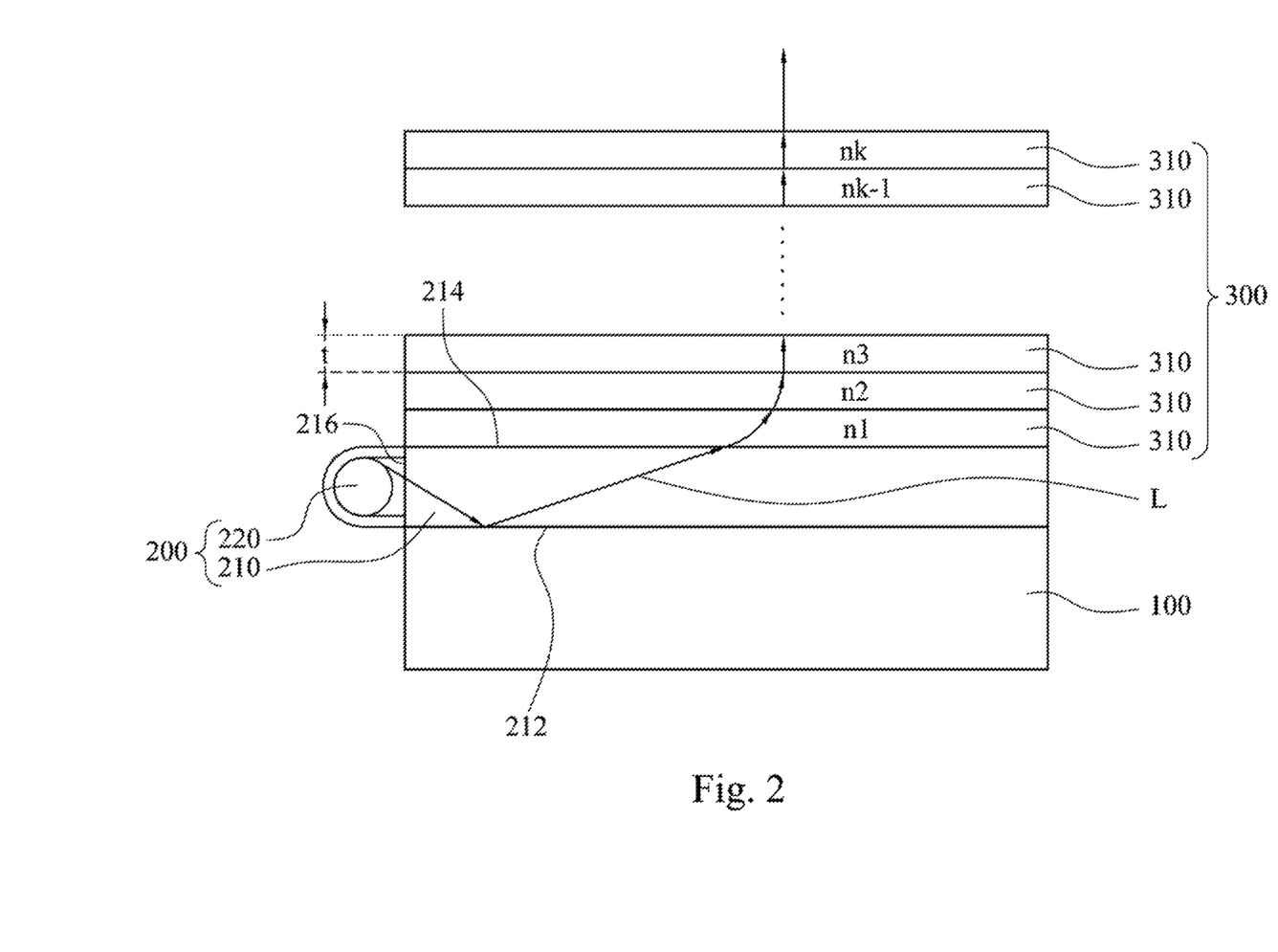
FIG. 2 is an optical path diagram of the reflective display apparatus in accordance with one embodiment of the present invention.

In particular, reference can be now made to FIG. 2, which is an optical path diagram of the reflective display apparatus in accordance with one embodiment of the present invention. As shown in FIG. 2, the front light module 200 provides a light to the bi-stable display 100, and the light reflected by the bi-stable display 100 is the light L. The optical films assembly 300 includes a plurality of light converging films 310. These light converging films 310 are located above the bi-stable display 100, so as to converge the light L reflected by the bi-stable display 100. In particular, the light converging film 310 that is closest to the bi-stable display 100 (the bottom light converging film 310 in FIG. 2) has a refractive index n1. In other words, the light converging film 310 that is closest to the front light module 200 has the refractive index n1. The light converging film 310 that is farthest from the bi-stable display 100 (the top light converging film 310 in FIG. 2) has a refractive index nk. In other words, the light converging film 310 that is farthest from the front light module 200 has the refractive index nk. The refractive index n1 is lower than the refractive index nk.

As a result, when the light L reflected by the bi-stable display 100 travels from the bottom light converging film 310 to the top light converging film 310, the light L can travel from the optically thinner medium (the medium having lower refractive index) to the optically denser medium (the medium having higher refractive index). According to Snell's Law, when the light L travels from the optically thinner medium to the optically denser medium, the refraction angle is lower than the incident angle, so that the light L converges inwardly. As such, even if the light L is reflected by the bi-stable display 100 at a high reflection angle, this light L can converge inwardly through the light converging films 310 due to the refractive indices difference, so as to effectively travel out of the reflective display apparatus and to get into the user's eyes, thereby improving the brightness of the reflective display device.

Moreover, because the brightness is improved by the difference between the refractive indices of the light converging films 310, the improvement of the brightness of the front light module 200 is not required, which saves the power of the front light module 200 and thereby balances the brightness requirement and the eco-friendly requirement of the reflective display apparatus.

In some embodiments, as shown in FIG. 2, the refractive indices of light converging films 310 increase along a direction away from the bi-stable display 100. In other words, the refractive indices of light converging films 310 increase along a direction away from the front light module 200. In particular, as shown in FIG. 2, the light converging films 310 arranged upwardly respectively have refractive indices n1, n2, n3, . . . , nk−1 and nk, in which n1<n2<n3< . . . <nk−1<nk. By the refractive indices difference, when the light L reflected by the bi-stable display 100 arrives at the boundary between any two of the light converging films 310 adjacent to each other, the light L converges inwardly according to Snell's Law. As a result, when the light L reflected by the bi-stable display 100 travels upwardly through different light converging films 310, the traveling direction of the light L shifts inwardly, so that the light L converges, and the brightness of the reflective display apparatus can be improved.

In some embodiments, as shown in FIG. 2, the light converging films 310 are stacked above the bi-stable display 100. In other words, the light converging films 310 are stacked on the front light module 200. In other words, any two of the light converging films 310 adjacent to each other are not spaced apart, so that any two of the light converging films 310 adjacent to each other are in contact with each other and form a boundary, which allows the light L reflected by the bi-stable display 100 to converge inwardly when traveling through the boundary.

In some embodiments, as shown in FIG. 2, each light converging film 310 has a thickness t. The thickness t ranges from 25 μm to 200 μm. The light converging film 310 having the thickness t within this range can more effectively converge the light L inwardly. In some embodiments, the light converging films 310 are optically clear adhesives (OCA) that have different refractive indices. The refractive indices difference can be implemented by modifying the material ingredients of the optically clear adhesives.

In some embodiments, as shown in FIG. 2, the light converging films 310 are farther away from the bi-stable display 100 than the front light module 200 is. In other words, at least a part of the front light module 200 is located between the light converging films 310 and the bi-stable display 100. As such, the light emitted by the front light module 200 can directly travel into the bi-stable display 100, rather than traveling into the bi-stable display 100 after traveling through the light converging films 310. Therefore, this configuration prevents the light emitted by the front light module 200 from being converged by the light converging films 310 and thereby prevents only partial bi-stable display 100 from receiving the light. In other words, the foregoing configuration facilitates the bi-stable display 100 to uniformly receive the light from the front light module 200.

In some embodiments, as shown in FIG. 2, the front light module 200 includes a light guide plate 210 and a light source 220. The light guide plate 210 is located between the bi-stable display 100 and the optical films assembly 300. The light source 220 is located beside the light guide plate 210. In particular, the light guide plate 210 includes a bottom surface 212, a top surface 214 and a lateral surface 216. The bottom surface 212 and the top surface 214 are opposite to each other. In some embodiments, the bottom surface 212 and the top surface 214 are substantially parallel to each other. The lateral surface 216 adjoins to the bottom surface 212 and the top surface 214. In some embodiments, the lateral surface 216 is substantially perpendicular to the bottom surface 212 and the top surface 214. The light source 220 is disposed on the lateral surface 216 of the light guide plate 210. The bi-stable display 100 is disposed on the bottom surface 212 of the light guide plate 210, and the optical films assembly 300 is disposed on the top surface 214 of the light guide plate 210.

During operation, the light source 220 emits light toward the lateral surface 216 of the light guide plate 210, so that the light travels into the light guide plate 210 through the lateral surface 216 and then travels into the bi-stable display 100 through the bottom surface 212. The bi-stable display 100 reflects the light. The reflected light L travels into the light guide plate 210 through the bottom surface 212, and then travels out of the light guide plate 210 into the optical films assembly 300 through the top surface 214. Therefore, by the foregoing configuration, the light emitted by the light source 220 can directly travel into the bi-stable display 100, rather than traveling into the bi-stable display 100 after traveling through the light converging films 310. As such, the foregoing configuration prevents the light that the light source 220 emits toward the bi-stable display 100 from being converged, thereby facilitating the bi-stable display 100 to uniformly receive the light from the front light module 200.

Figure 3:
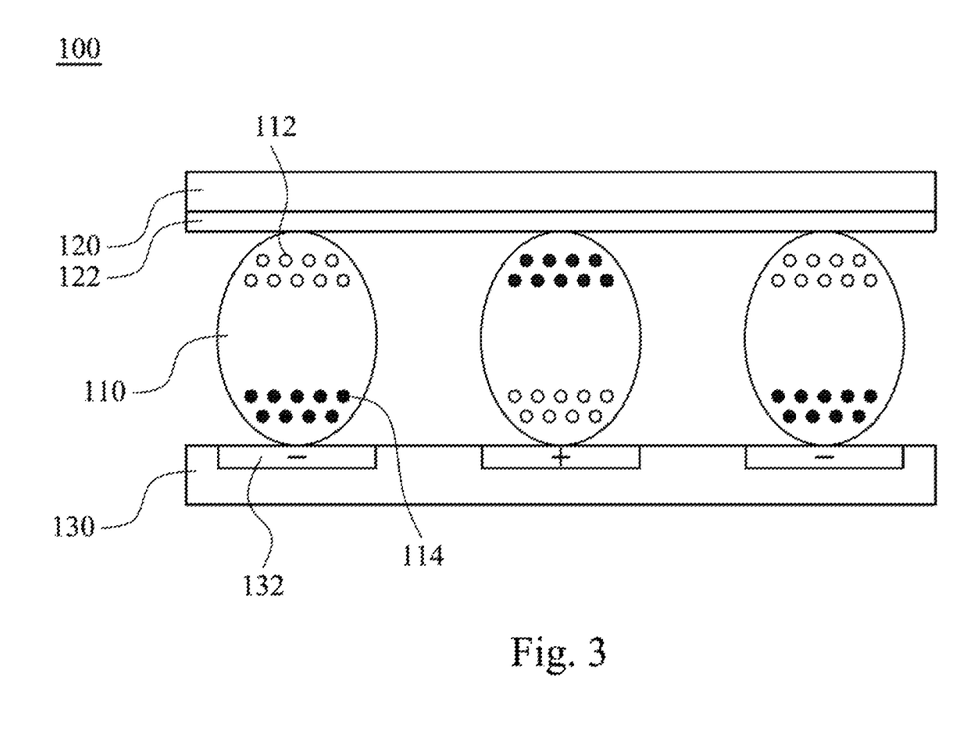
FIG. 3 is a side view of the bi-stable display in accordance with one embodiment of the present invention.

FIG. 3 is a side view of the bi-stable display 100 in accordance with one embodiment of the present invention. As shown in FIG. 3, in some embodiments, the bi-stable display 100 is an electrophoretic display that includes a plurality of microcapsules 110 and light permeable substrates 120 and 130. The microcapsules 110 are sandwiched between the light permeable substrates 120 and 130. The light permeable substrate 120 has a common electrode 122. The light permeable substrate 130 has a plurality of driving electrodes 132. Each of the microcapsules 110 has light-colored charged particles 112 and dark-colored charged particles 114. The light-colored charged particle 112 and the dark-colored charged particle 114 have charges in different types. For example, the light-colored charged particles 112 may be negatively charged, and the dark-colored charged particles 114 may be positively charged. The common electrode 122 and the driving electrodes 132 controls the positions of the light-colored charged particles 112 and the dark-colored charged particles 114.

In particular, when the polarity of the driving electrode 132 changes, the light-colored charged particles 112 or the dark-colored charged particles 114 move upwardly or downwardly based on the polarity of the driving electrode 132. When the light L (See FIG. 2) travels through the light permeable substrate 120 and arrives at the light-colored charged particle 112, the light L is reflected by the light-colored charged particle 112; in contrast, when the light L travels through the light permeable substrate 120 and arrives at the dark-colored charged particle 114, the light L is absorbed by the dark-colored charged particle 114. Therefore, the user can see a monochrome image. In some embodiments, the bi-stable display 100 may optionally include a color filter (not shown), so as to form a colored image.

Figure 4:
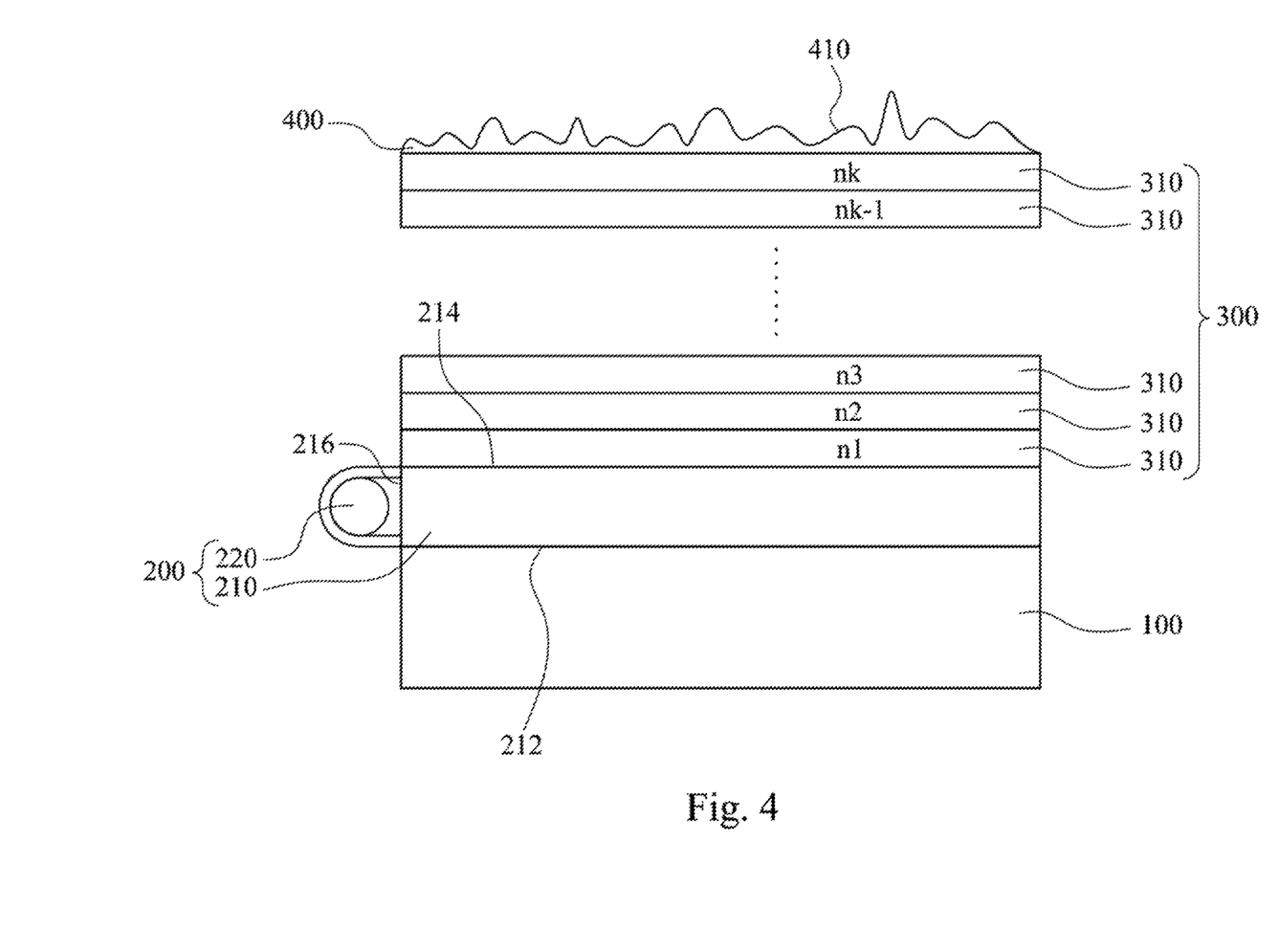
FIG. 4 is a side view of a reflective display device in accordance with another embodiment of the present invention.

FIG. 4 is a side view of a reflective display device in accordance with another embodiment of the present invention. As shown in FIG. 4, the main difference between this embodiment and the embodiment shown in FIG. 2 is that: the reflective display apparatus further includes a light outgoing layer 400. The light outgoing layer 400 is disposed on the light converging film 310 that is farthest from the bi-stable display 100 (the top light converging film 310 in FIG. 4). In other words, the light outgoing layer 400 is disposed on the light converging film 310 that is farthest from the front light module 200. The light outgoing layer 400 has a top surface 410. The top surface 410 is rough and uneven. As such, when the light L (See FIG. 2) reflected by the bi-stable display 100 arrives at the top surface 410, the rough top surface 410 prevents the total internal reflection, so that the light L can travel out of the top surface 410, thereby further promoting the brightness of the reflective display apparatus.

Figure 5:
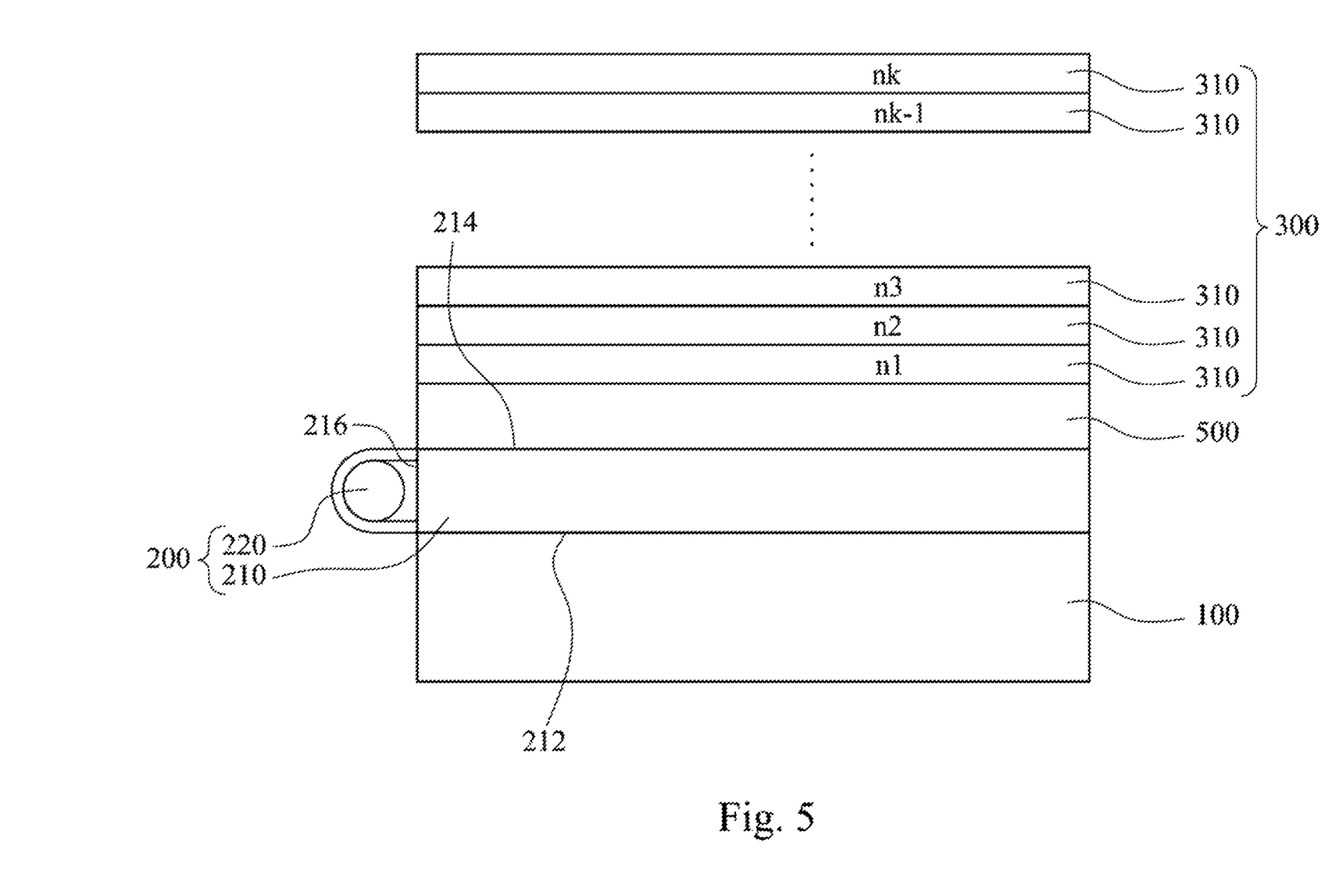
FIG. 5 is a side view of a reflective display device in accordance with another embodiment of the present invention.

FIG. 5 is a side view of a reflective display device in accordance with another embodiment of the present invention. As shown in FIG. 5, the main difference between this embodiment and the embodiment shown in FIG. 2 is that: the reflective display apparatus further includes a prism sheet 500. The prism sheet 500 is farther away from the bi-stable display 100 than the front light module 200 is, so as to converge the light L (See FIG. 2) reflected by the bi-stable display 100. In other words, this embodiment not only uses the light converging films 310 to converge the light L, but also uses the prism sheet 500 to converge the light L, so as to further increase the angle that the light L converges, thereby promoting the brightness of the reflective display apparatus.

For example, the prism sheet 500 can be located between the front light module 200 and the light converging films 310. In particular, the prism sheet 500 is disposed on the top surface 214 of the light guide plate 210. The optical films assembly 300 is disposed on the prism sheet 500. Because the prism sheet 500 is located on the top surface 214 of the light guide plate 210, and the bi-stable display 100 is disposed on the bottom surface 212 of the light guide plate 210, the light that the light source 220 emits toward the bi-stable display 100 can directly travel into the bi-stable display 100, rather than traveling into the bi-stable display 100 after traveling through the prism sheet 500. As such, the foregoing configuration prevents the light that the light source 220 emits toward the bi-stable display 100 from being converged, thereby facilitating the bi-stable display 100 to uniformly receive the light from the light source 220.

Figure 6:
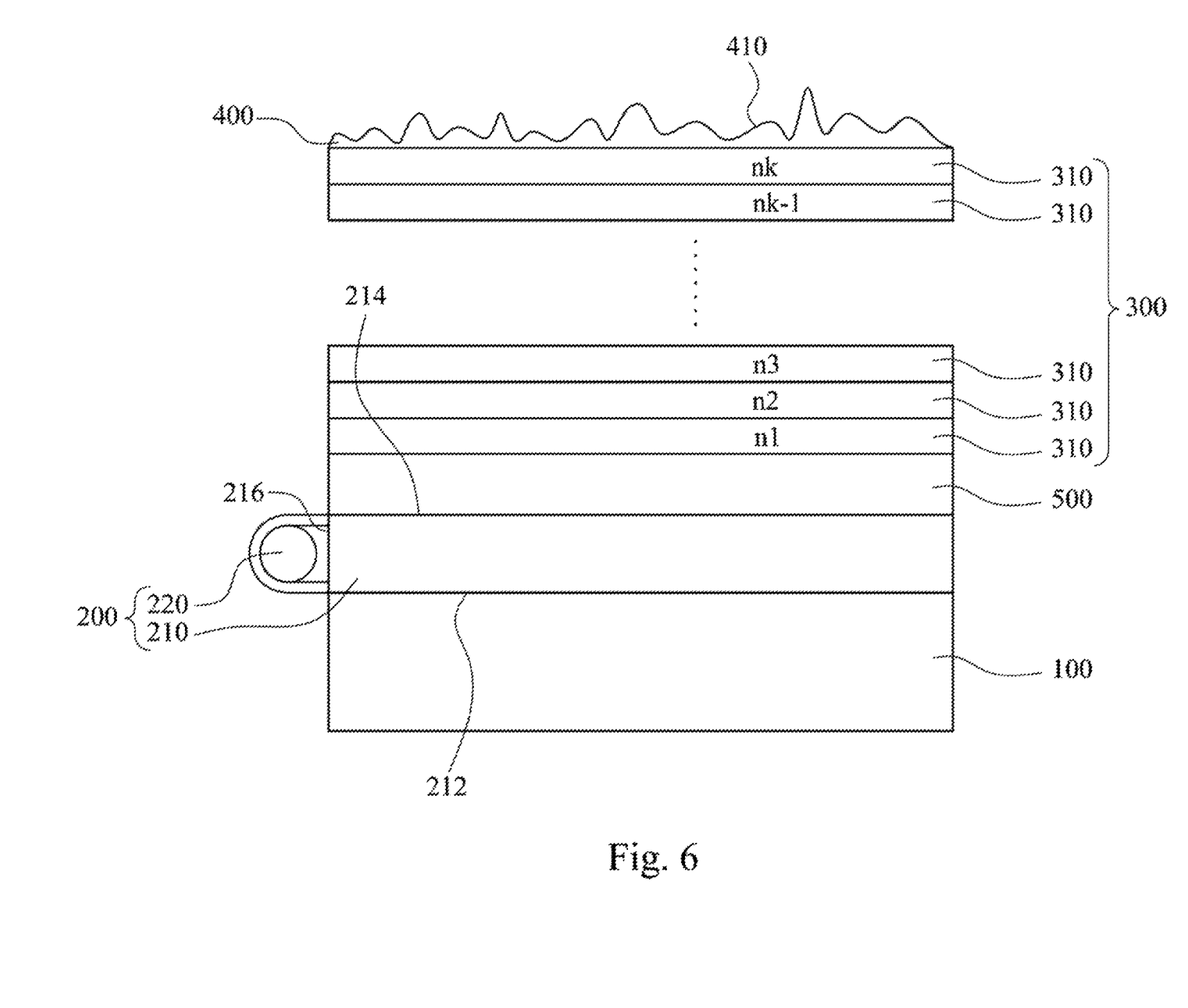
FIG. 6 is a side view of a reflective display device in accordance with another embodiment of the present invention.

FIG. 6 is a side view of a reflective display device in accordance with another embodiment of the present invention. As shown in FIG. 6, the main difference between this embodiment and the embodiment shown in FIG. 2 is that: the reflective display apparatus includes a light outgoing layer 400 and a prism sheet 500. The light outgoing layer 400 is disposed on the light converging film 310 that is farthest from the bi-stable display 100 (the top light converging film 310 in FIG. 6) to facilitate outputting the light. The prism sheet 500 is disposed between the light guide plate 210 and the light converging film 310 that is closest to the bi-stable display 100 (the bottom light converging film 310 in FIG. 6), so as to improve the light converging ability. By the light outgoing layer 400 and the prism sheet 500, the reflective display apparatus can further improve the brightness of the reflective display apparatus.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A reflective display device, comprising:
   a bi-stable display;
   a front light module configured to provide a light to the bi-stable display, so that the bi-stable display reflects the light, wherein the front light module comprises a light guide plate; and
   first, second and third light converging films made of first, second and third optically clear adhesives, respectively, and stacked in sequence over the front light module, configured to converge the light reflected by the bi-stable display,
   wherein the refractive index of the first light converging film that is made of the first optically clear adhesive and closest to the light guide plate is lower than the refractive index of the third light converging film that is made of the third optically clear adhesive and farthest from the light guide plate, wherein the refractive index of the second light converging film is between the refractive indices of the first and the third light converging films.

2. The reflective display device of claim 1, wherein the refractive indices of light converging films increase along a direction away from the bi-stable display.

3. The reflective display device of claim 1, wherein the light converging films are stacked above the bi-stable display.

4. The reflective display device of claim 1, wherein the light converging films are farther away from the bi-stable display than the front light module is.

5. The reflective display device of claim 1, wherein at least a part of the front light module is located between the light converging films and the bi-stable display.

6. The reflective display device of claim 1, wherein a thickness of each of the light converging films ranges from 25 µm to 200 µm.

7. The reflective display device of claim 1, further comprising:
a light outgoing layer disposed on the light converging film that is farthest from the bi-stable display, the light outgoing layer having a top surface, the top surface being rough.

8. The reflective display device of claim 1, further comprising:
a prism sheet being farther away from the bi-stable display than the front light module being, so as to converge the light reflected by the bi-stable display.

9. The reflective display device of claim 8, wherein the prism sheet is located between the light converging films and the front light module.

10. A front light structure, comprising:
a front light module comprising a light guide plate; and
first, second and third light converging films made of first, second and third optically clear adhesives, respectively and stacked in sequence over the front light module,
wherein the refractive index of the first light converging film that is made of the first optically clear adhesive and closest to the light guide plate is lower than the refractive index of the third light converging film that is made of the third optically clear adhesive and farthest from the light guide plate, wherein the refractive index of the second light converging film is between the refractive indices of the first and third light converging films.

11. The front light structure of claim 10, wherein the refractive indices of light converging films increase along a direction away from the front light module.

12. The front light structure of claim 10, wherein a thickness of each of the light converging films ranges from 25 µm to 200 µm.

13. The front light structure of claim 10, further comprising:
a light outgoing layer disposed on the light converging film that is farthest from the front light module, the light outgoing layer having a top surface, the top surface being rough.

14. The front light structure of claim 10, further comprising:
a prism sheet located between the light converging films and the front light module.

* * * * *